(12) United States Patent
Bartel et al.

(10) Patent No.: US 10,334,780 B2
(45) Date of Patent: Jul. 2, 2019

(54) MOWER WITH FOLDING FRAME

(71) Applicant: Excel Industries, Inc., Hesston, KS (US)

(72) Inventors: Harlan John Bartel, North Newton, KS (US); Brian Roy Funk, Lehigh, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 974 days.

(21) Appl. No.: 14/463,192

(22) Filed: Aug. 19, 2014

(65) Prior Publication Data

US 2016/0050847 A1    Feb. 25, 2016

(51) Int. Cl.
*A01D 34/00* (2006.01)
*A01D 34/64* (2006.01)

(52) U.S. Cl.
CPC ........ *A01D 34/64* (2013.01); *A01D 2034/645* (2013.01)

(58) Field of Classification Search
CPC ...... A01D 34/661; A01D 34/64; A01D 34/74; A01D 34/662; A01D 2034/645
USPC ...................... 56/14.9, 15.1, 15.2, 15.6, 15.9
See application file for complete search history.

(56) References Cited

U.S. PATENT DOCUMENTS

| | | |
|---|---|---|
| 2,566,144 A | 8/1951 | Thomas |
| 2,665,621 A | 1/1954 | Smith et al. |
| 3,369,350 A | 2/1968 | Rogers et al. |
| 3,496,707 A | 2/1970 | Kobey |
| 3,667,200 A | 6/1972 | Pool et al. |
| 3,777,459 A | 12/1973 | Elliott |
| 4,549,721 A | 10/1985 | Stone |
| 4,622,806 A | 11/1986 | Bahnman et al. |
| 4,779,406 A | 10/1988 | Schroeder |
| 4,869,054 A | 9/1989 | Hostetler et al. |
| 5,079,907 A | 1/1992 | Sameshima et al. |
| 5,528,886 A | 6/1996 | Esau |
| 5,704,201 A | 1/1998 | Van Vleet |
| 5,816,035 A | 10/1998 | Schick |
| 5,826,414 A | 10/1998 | Lenczuk |
| 5,927,055 A | 7/1999 | Ferree et al. |
| 6,116,007 A | 9/2000 | Eggena et al. |
| 6,205,754 B1 | 3/2001 | Laskowski |
| 6,308,503 B1 | 10/2001 | Scag et al. |
| 6,347,503 B1 | 2/2002 | Esau et al. |
| 6,393,815 B1 | 5/2002 | Funk et al. |
| 6,434,919 B2 | 8/2002 | Schick |

(Continued)

OTHER PUBLICATIONS

Promotional sales material entitled Stevens RD 1648 Rider Mower dated Nov. 13, 2009.

*Primary Examiner* — Thomas B Will
*Assistant Examiner* — Mai T Nguyen
(74) *Attorney, Agent, or Firm* — Robert O. Blinn

(57) ABSTRACT

A lawn mower includes a mower frame that is able to articulate between a rear frame portion and a forward frame portion. In one embodiment, the rear frame portion is supported by two main drive wheels and carries an engine and controls for operating the mower. The forward frame portion carries a mowing deck which is suitable for cutting grass. The frame may be latched in a lowered mowing position by a releasable frame latch, but, when frame latch is released, the rear frame portion and the forward frame portion may be folded with respect to each other to provide access to the underside of the raised portion.

11 Claims, 20 Drawing Sheets

(56) References Cited

U.S. PATENT DOCUMENTS

| | | |
|---|---|---|
| 6,588,188 B2 | 7/2003 | Dennis |
| 6,675,564 B1 | 1/2004 | Ward |
| 6,684,615 B1 | 2/2004 | Bland et al. |
| 6,874,308 B1 | 5/2005 | Bartel |
| 6,988,351 B2 | 1/2006 | Schick et al. |
| 7,028,456 B2 | 4/2006 | Thatcher |
| D538,302 S | 3/2007 | Kigashikawa |
| 7,293,398 B2 | 11/2007 | Koehn |
| 7,347,039 B2 | 3/2008 | Koehn |
| 7,451,586 B1 * | 11/2008 | Papke ............... A01D 34/662 56/15.9 |
| 7,478,519 B2 | 1/2009 | Phillips |
| 7,481,036 B2 | 1/2009 | Liliestielke et al. |
| 7,596,936 B2 | 10/2009 | Schick |
| 7,600,363 B2 | 10/2009 | Porter et al. |
| 7,610,739 B2 | 11/2009 | Godfrey |
| 7,640,719 B2 | 1/2010 | Boyko |
| 7,669,395 B2 | 2/2010 | Wehler et al. |
| 7,841,157 B2 | 11/2010 | Latuszek et al. |
| 7,870,710 B2 | 1/2011 | Koehn |
| 7,870,711 B2 | 1/2011 | Koehn |
| RE42,109 E | 2/2011 | Cartner |
| 7,877,973 B2 | 2/2011 | Godfrey |
| 8,091,329 B2 | 1/2012 | Schick |
| D655,316 S | 3/2012 | Moriguchi et al. |
| 8,166,735 B1 * | 5/2012 | Schnell ............... A01D 34/661 56/228 |
| 8,393,136 B1 | 3/2013 | Fraley et al. |
| 2004/0221561 A1 | 11/2004 | Koehn |
| 2005/0016143 A1 * | 1/2005 | Thatcher ............... A01D 34/74 56/15.6 |
| 2006/0179807 A1 | 8/2006 | Thatcher et al. |
| 2008/0163597 A1 | 7/2008 | Koehn |
| 2008/0163598 A1 | 7/2008 | Koehn |
| 2009/0121203 A1 | 5/2009 | Martini et al. |
| 2012/0266580 A1 | 10/2012 | Ulmafors et al. |
| 2012/0324855 A1 | 12/2012 | Sauerwein et al. |
| 2013/0047566 A1 | 2/2013 | Takahashi et al. |

* cited by examiner

MOWER WITH FOLDING FRAME

RELATED APPLICATIONS

None

FIELD

This application relates to a mower with a folding frame including a rear frame portion and a forward frame portion which can be folded from a mowing position to a folded position.

BACKGROUND

Large lawnmowers include mower decks which usually have one or more cutting blades. It is advantageous to have easy access to the underside of a mower or mower deck for various maintenance reasons, such as changing blades, accessing difficult to reach portions of the underside of the mower or for purposes of rearranging baffles or changing the discharge mode of a mowing deck. Large mowers having tilt-up mower decks have typically required the removal of drive belts and other mechanical steps in order to permit the tilt-up operation to access the underside of a mower. What is needed is a large mower which can be quickly and easily arranged to allow a portion of the mower frame to fold up in order to access the underside of a portion of the mower.

SUMMARY

The above stated need is addressed by a mower which has a mower frame that is articulated so that a rear frame portion and a forward frame portion are able to fold between a mowing or operating position and a folded position. In this example, the rear frame portion is supported by two main drive wheels and carries an engine and controls for operating the mower. The forward frame portion supports a mower deck which is suitable for cutting grass and which may be adjusted up and down for changing the cutting height. An actuator is mechanically associated with the rear frame portion and the forward frame portion and is operable in two modes: (1) a first mode for adjusting the cutting height of the mower deck and, (2) a second mode for folding the frame. The frame folding mode is most often used to raise the forward frame portion to provide access to the underside mower deck but, in certain embodiments, also may be used to raise the rear frame to allow access to components mounted to the rear frame portion.

DETAILED DESCRIPTION

Figure 1:
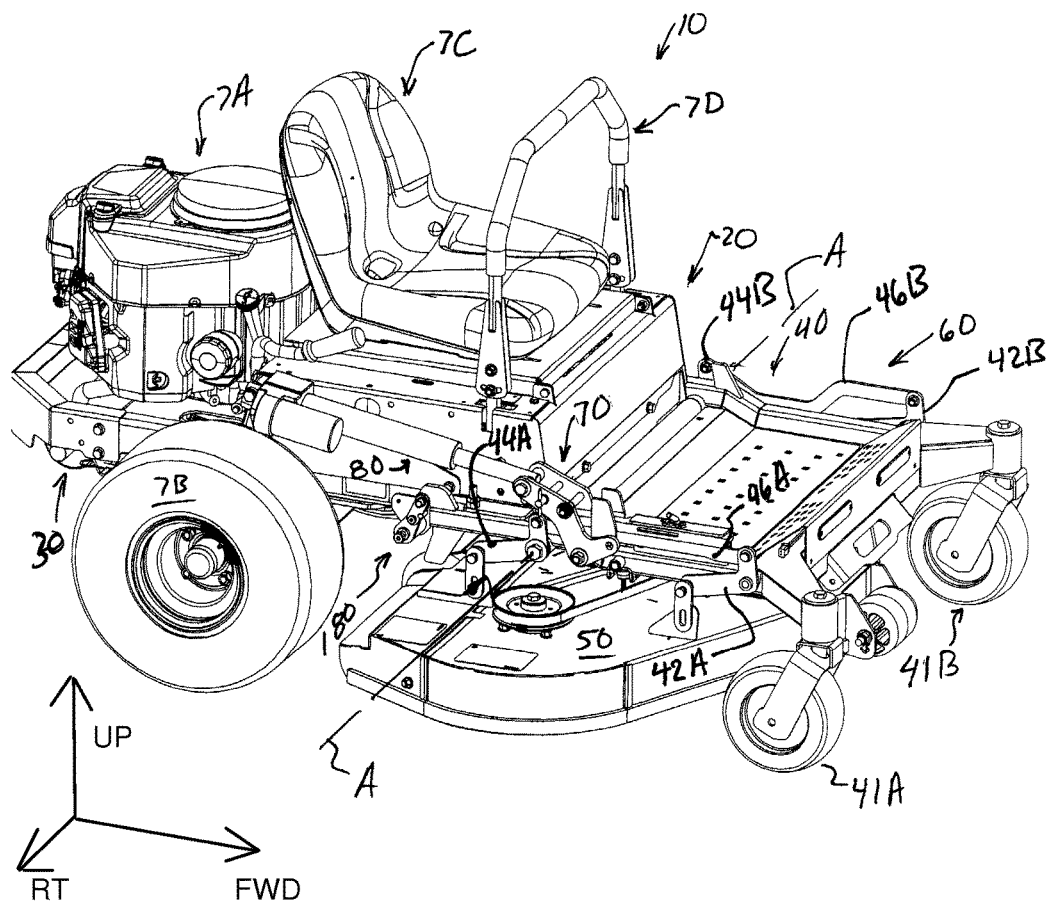
FIG. 1 is a perspective view of one embodiment of a mower shown with a forward frame portion of mower frame in the lowered mowing position.
Figure 8:
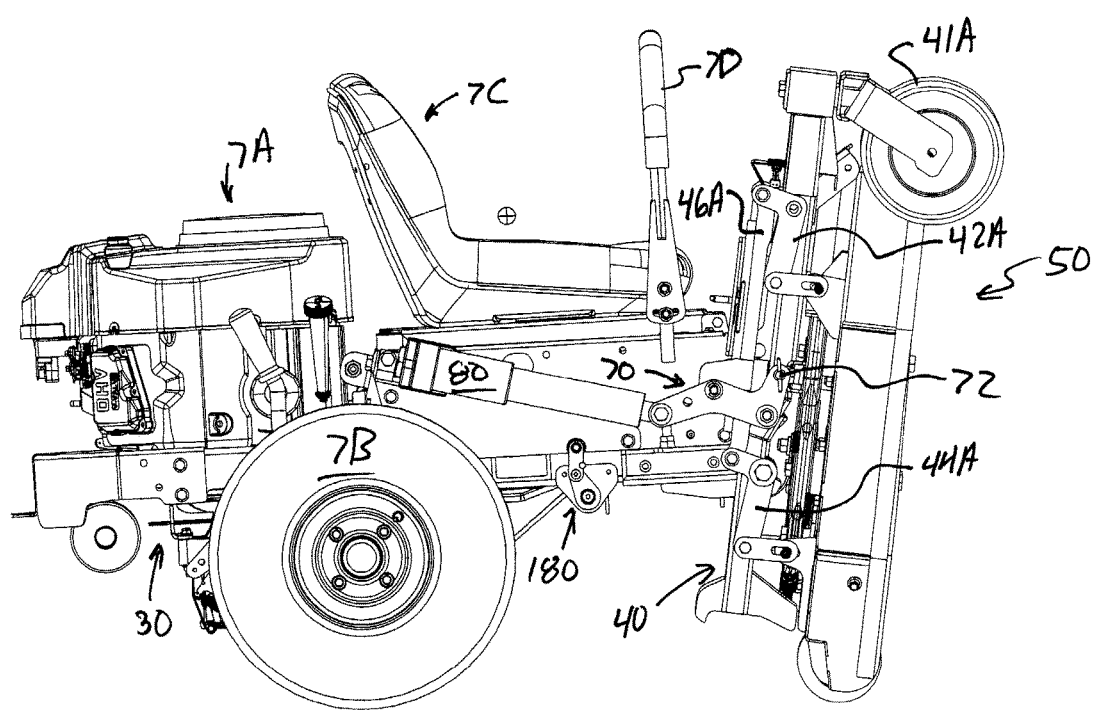
FIG. 8 is a side view of one embodiment of the mower shown with the mower frame fully folded.
Figure 9:
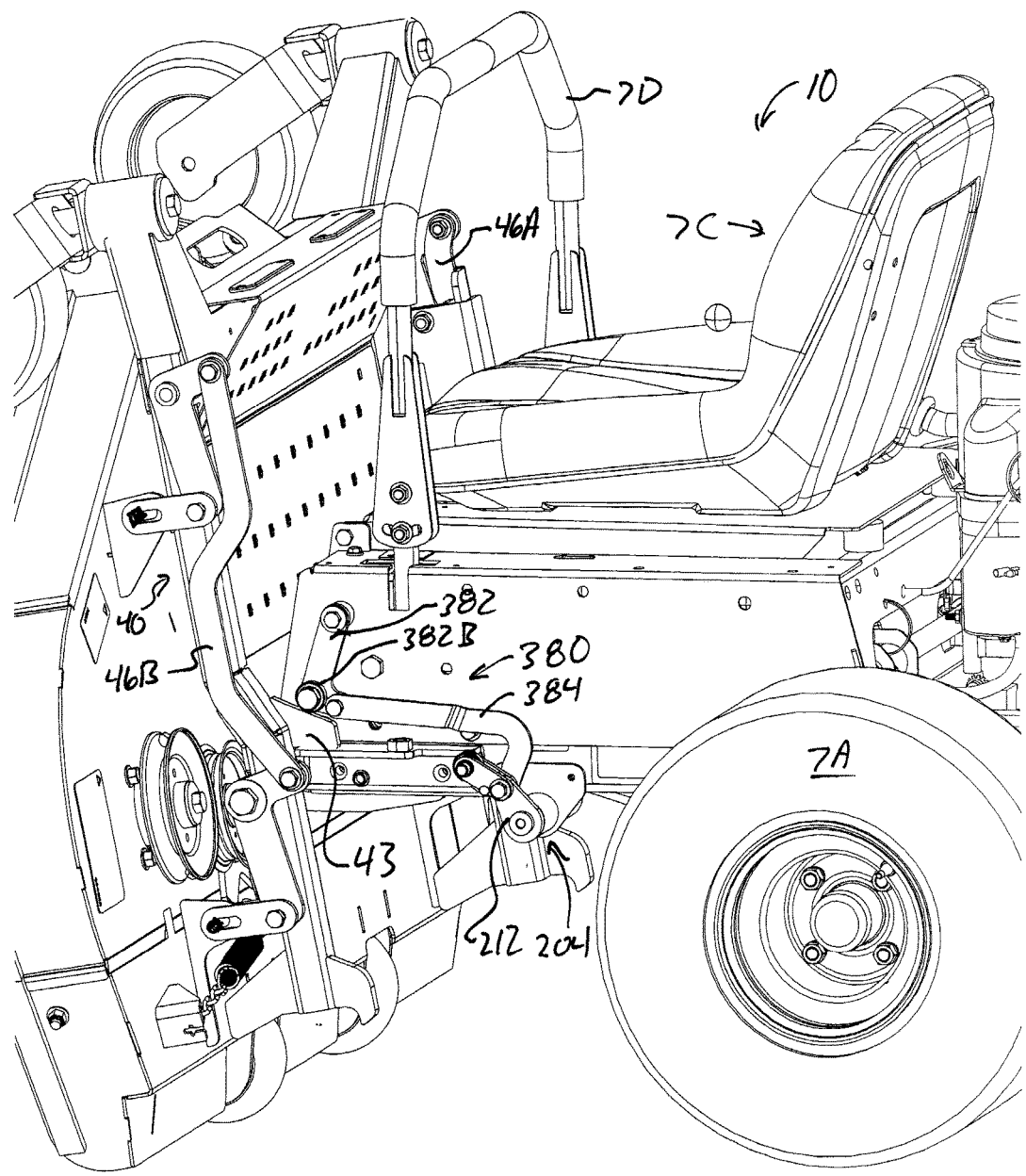
FIG. 9 is a fragmentary perspective view of one embodiment of the mower shown with the forward frame portion fully folded up in the folded-up mower deck access position showing a safety latch which is engaged for securing the forward frame portion in a folded position suitable for accessing the underside of the mower deck.
Figure 21:
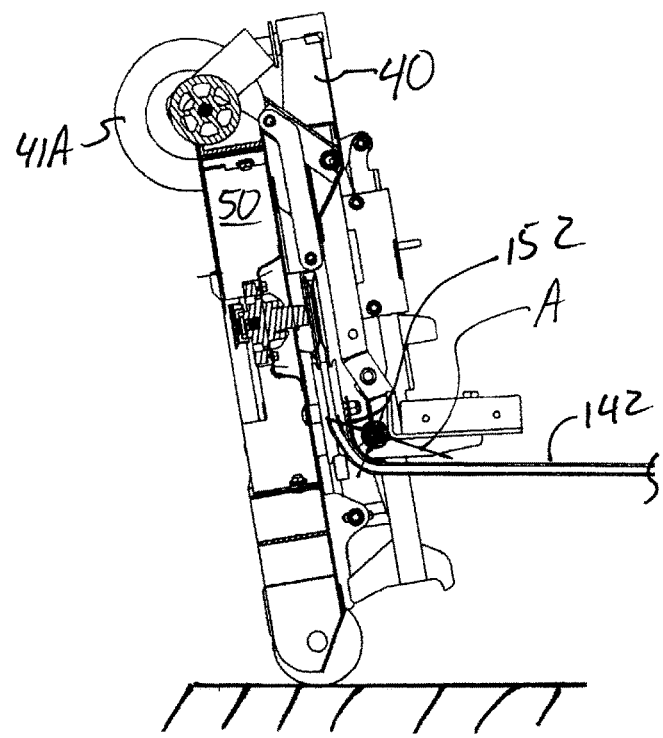
FIG. 21 is a side view of the forward frame portion and the mower deck shown with the frame folded for accessing the mower deck.

Referring to the drawings, FIG. 1 shows one embodiment of a mower 10, which, in this example, is a riding mower. As can be seen in FIG. 1, mower 10 includes a mower frame 20. Mower frame 20 is hinged at a torque tube on axis A thereby defining a rear frame portion 30 and a forward frame portion 40. In this example, rear frame portion 30 supports the engine 7A, drive wheels 7B, operator's seat 7C and operator controls 7D. Forward frame portion 40 caries two front wheels 41A and 41B for supporting the forward end of mower 10 and a mower deck 50. Rear frame portion 30 and forward frame portion 40 are articulated at a torque tube for rotation relative to each other around transverse axis A which is indicated in FIG. 1. In this detailed description and in other portions of the specification and claims, "transverse" should be understood as a direction that is generally parallel to the axis labeled "RT" (for right) in FIG. 1. Still further, "longitudinal" as used herein should be understood as a direction that is generally parallel to the axis labeled "FWD" in FIG. 1. In order to provide access to mower deck 50, forward frame portion 40 can be rotated around transverse axis A between a first, mowing position as shown in FIGS. 1-5 and a second, folded position as shown in FIGS. 8, 9 and 21. When in the mowing position, rear frame portion 30 and forward frame portion 40 may generally define a straight angle (180°). When in the folded position, rear frame portion 30 and forward frame portion 40 define an angle that is smaller in magnitude than a straight angle, which in this example is about 110°. In this example, mower deck 50 is suspended from forward frame portion 40 by a pivot lever assembly 60 which will be described in greater detail below. During normal operations, when forward frame portion 40 is in the mowing position shown in FIGS. 1-5, rear frame portion 30 and forward frame portion 40 are secured in the mowing position by a frame latch mechanism 180.

Figure 11:
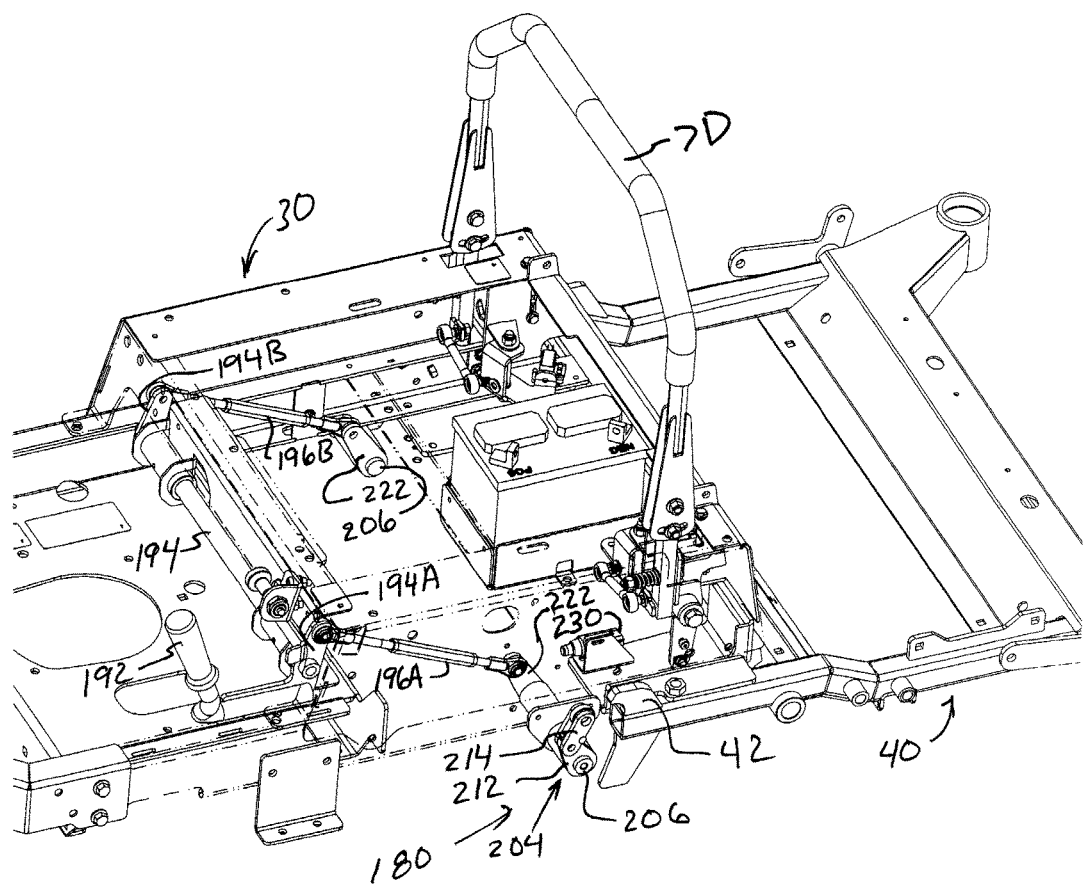
FIG. 11 is a fragmentary perspective view of one embodiment of the mower shown with the forward frame portion in the lowered mowing position showing the frame latch disengaged.
Figure 12:
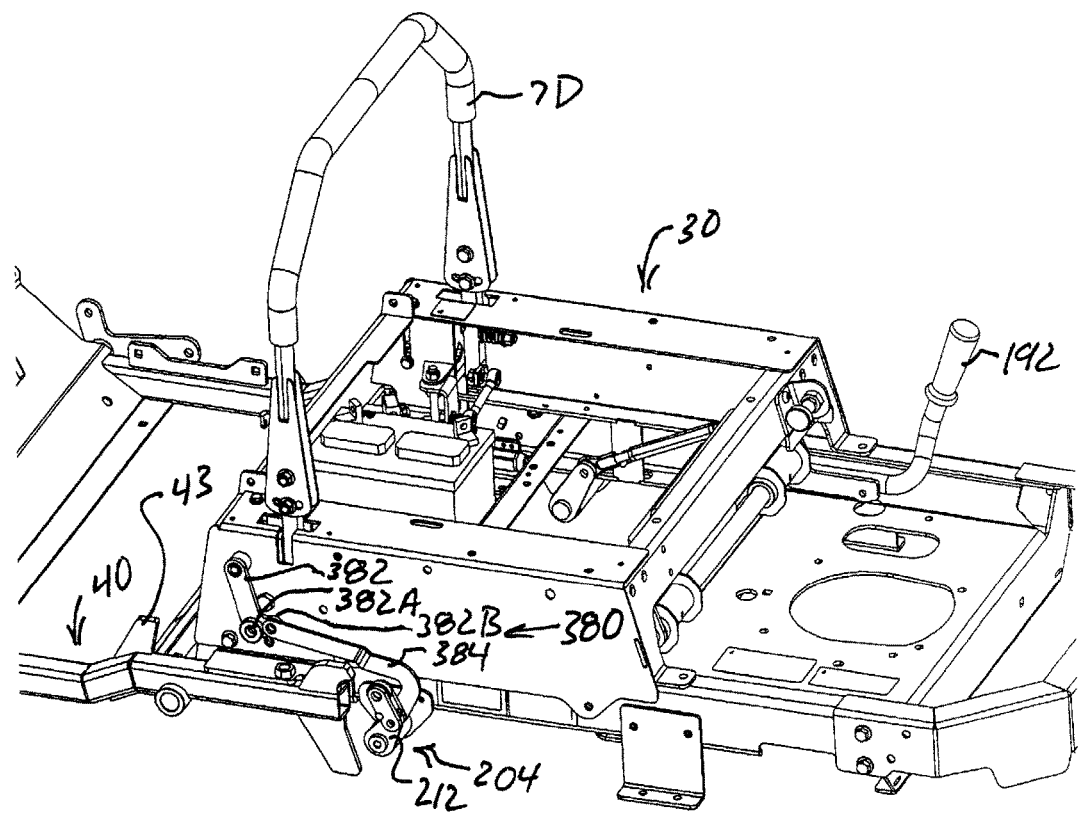
FIG. 12 is a fragmentary perspective view of one embodiment of the mower showing the left side of the mower with the forward frame portion in the mowing position shown with the frame latch disengaged.

Many suitable securing devices could be selected for securing forward frame portion 40 and rear frame portion 30 in the mowing position shown in FIGS. 1-4. As can be seen in FIGS. 11 and 12, in this example, a frame latch mechanism 180 is provided for securing forward frame portion 40 in the mowing position shown in FIGS. 1-4. In this example, frame latch mechanism 180 includes a latch handle 192, two opposite pivotably mounted over center link assemblies 204 and linkages extending between latch handle 192 and over center link assemblies 204. The linkages between latch handle 192 and over center link assemblies 204 can be understood by referring to FIGS. 11 and 12. In this example, latch handle 192 is connected to a shaft 194 which extends transversely across rear frame portion 30 generally beneath and behind the general mounting location of the operator's seat. The operator's seat is not shown in FIGS. 11 and 12. Two links 194A and 194B are fixed to the opposite ends of shaft 194.

Figure 10:
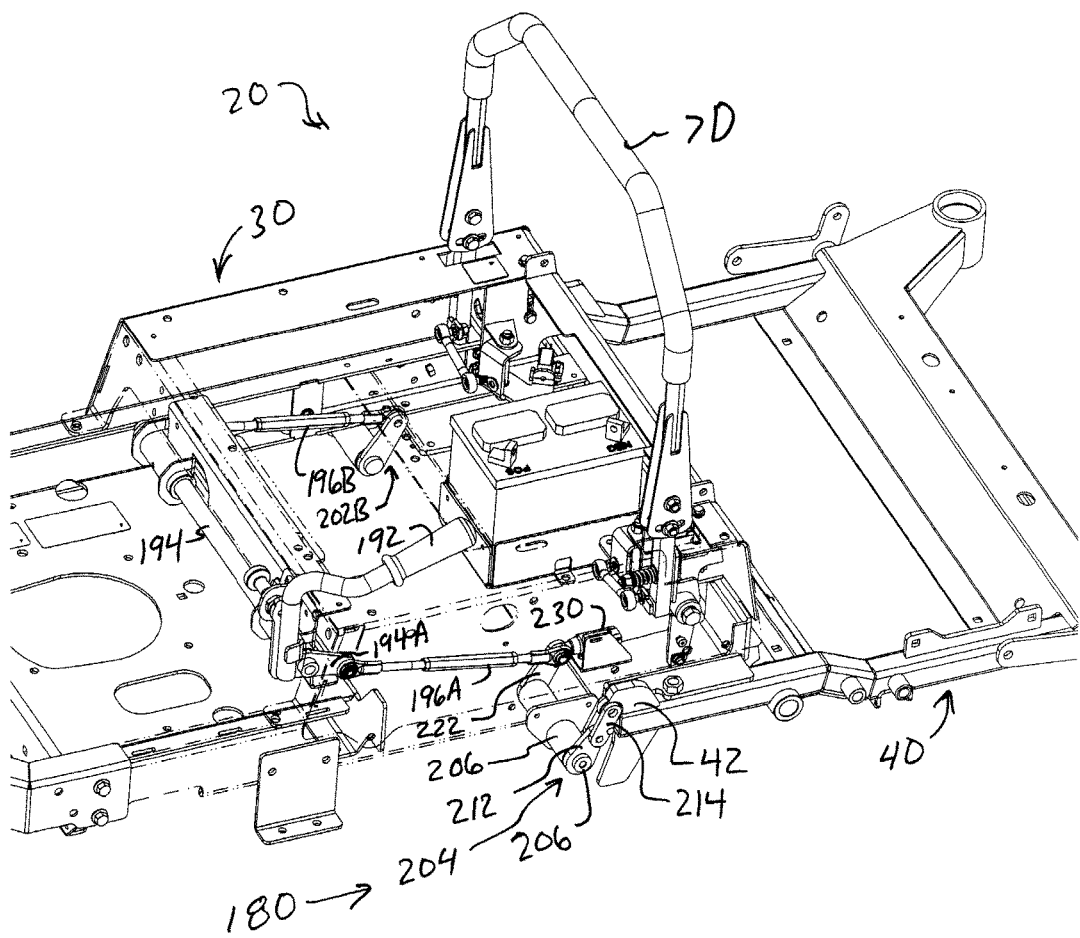
FIG. 10 is a fragmentary perspective view of one embodiment of the mower shown with the forward frame portion in the lowered mowing position showing the frame latch engaged to secure the forward frame portion in the mowing position.

We can now consider the remaining portions of the frame latch linkage mechanism on the right side of mower 10 while the skilled reader will bear in mind that a nearly identical arrangement is present on the opposite left side of the mower. Over center link assembly 204 includes a proximal link 212 and a distal link 214 which is pivotably connected to the distal end of proximal link 212. Proximal link 212 is fixed to the outboard end of a transfer shaft 206 which is pivotably mounted to the right side of rear frame portion 30. A transfer link 222 is fixed to the inboard end of transfer shaft 206. A connecting rod 196A is pivotably connected at one end to link 194A, which, as the skilled reader will recall, is fixed to the right end of shaft 194. The other end of connecting rod 196A is pivotably connected to the distal end of transfer link 222. Accordingly, when handle 192 is in a forward position as shown in FIG. 10, link 194A is tilted forward, link 222 is tilted forward and over center link assembly 204 engages a hook 42 formed on a proximal end of forward frame portion 40 thereby latching forward frame portion 40 in the mowing position with respect to rear frame portion 30 as shown in FIG. 1. Conversely, when handle 192 is rotated back to the position shown in FIG. 11, links 194A and 222 rotate back causing over center link assembly 204 to disengage from and rotate away from hook 42 which unlatches forward frame portion 40 thereby allowing forward frame portion 40 to pivot up with respect to rear frame portion 30. The skilled reader should bear in mind, that, in this example, the same actions are occurring with symmetrically identical parts on the opposite side of mower 10.

Figure 3:
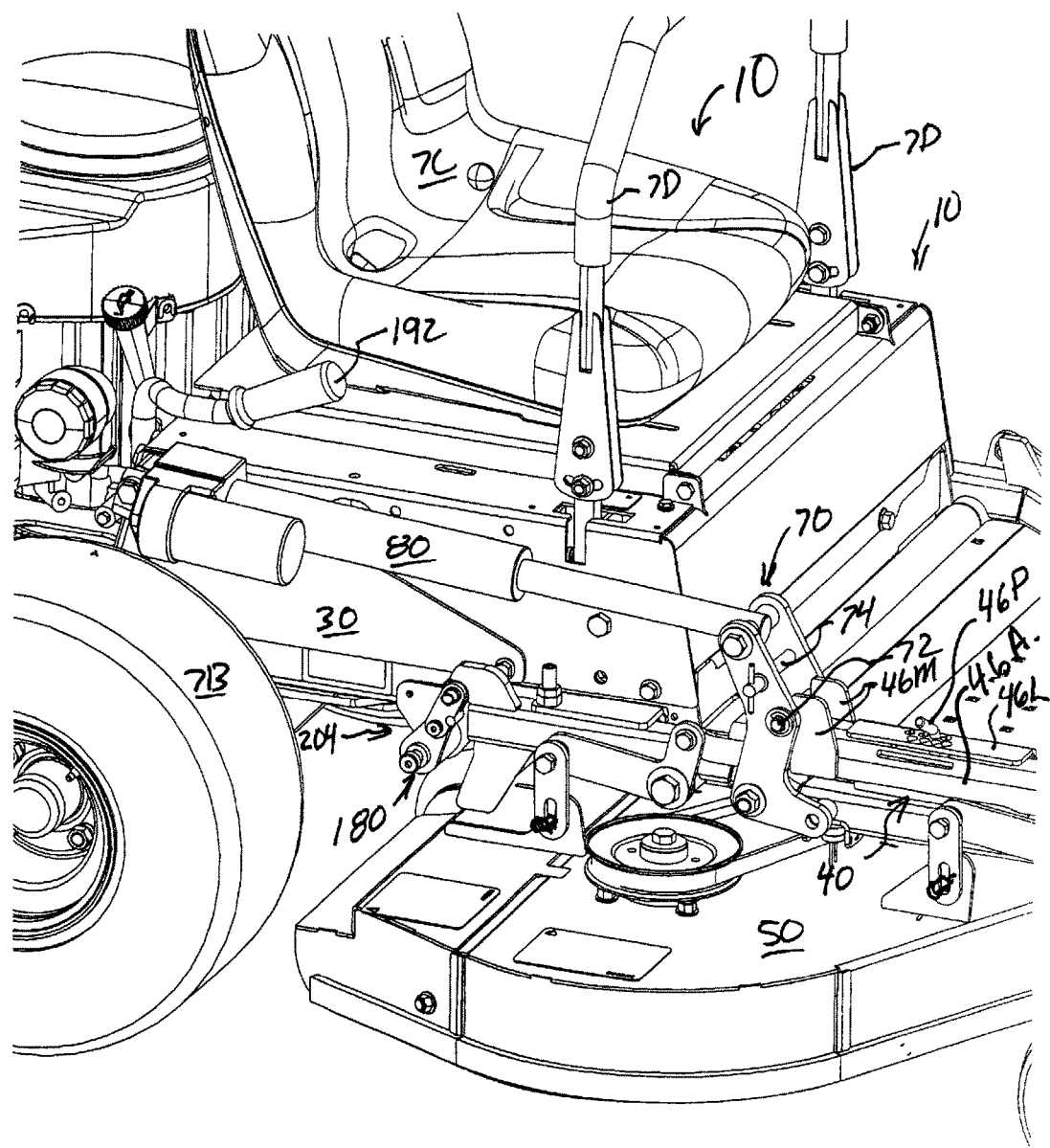
FIG. 3 is a perspective view of one embodiment of the mower shown with the forward frame portion in the lowered mowing position, with the mower deck raised to the highest cutting position and with the pivot bracket unlocked from the forward frame portion but positioned for securing the pivot bracket to the forward frame portion.
Figure 4:
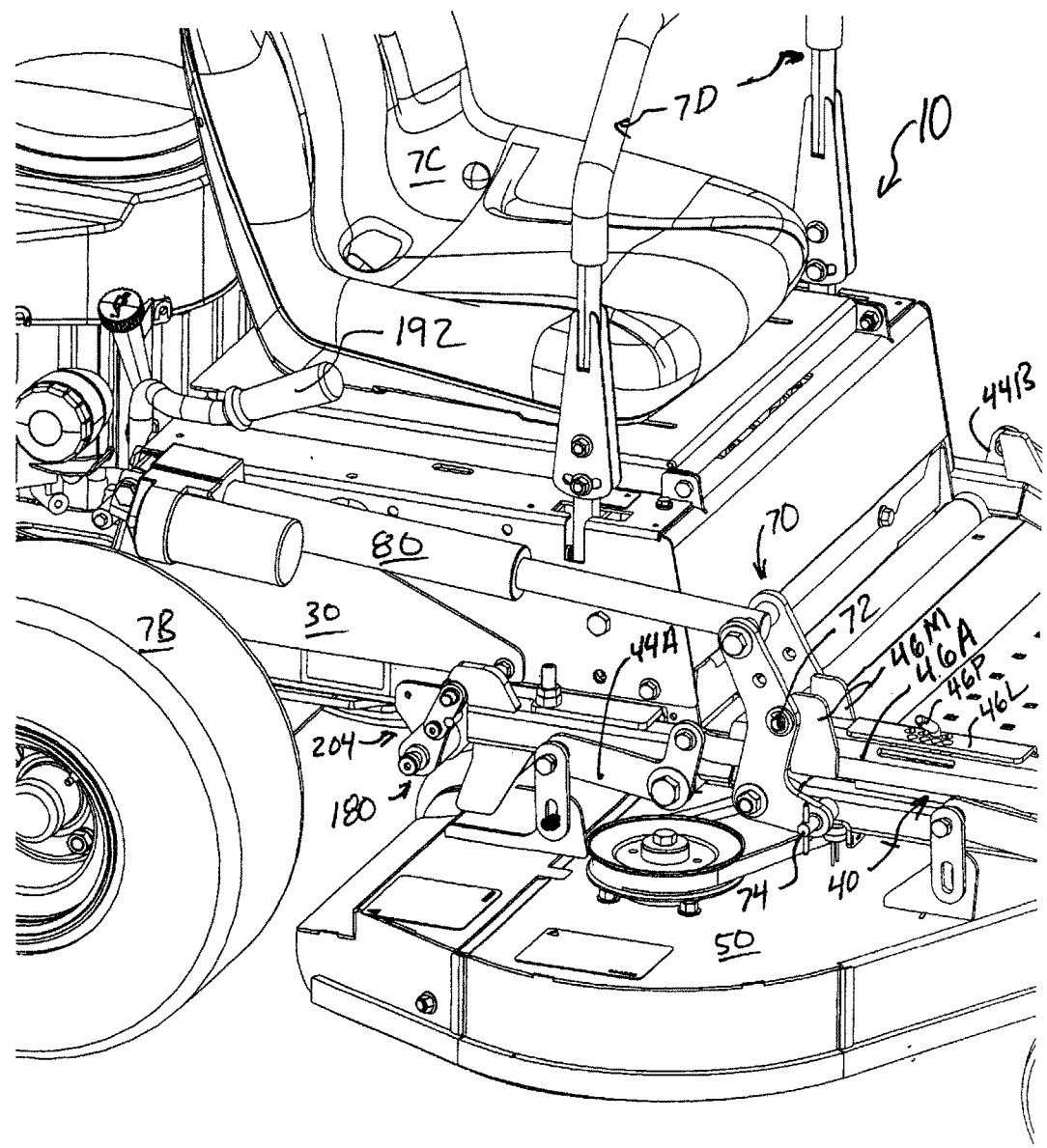
FIG. 4 is a perspective view of one embodiment of the mower shown with the forward frame portion in the lowered mowing position, with the mower deck raised to the highest cutting position and with the pivot bracket secured to the forward frame portion in preparation for folding the frame.
Figure 5:
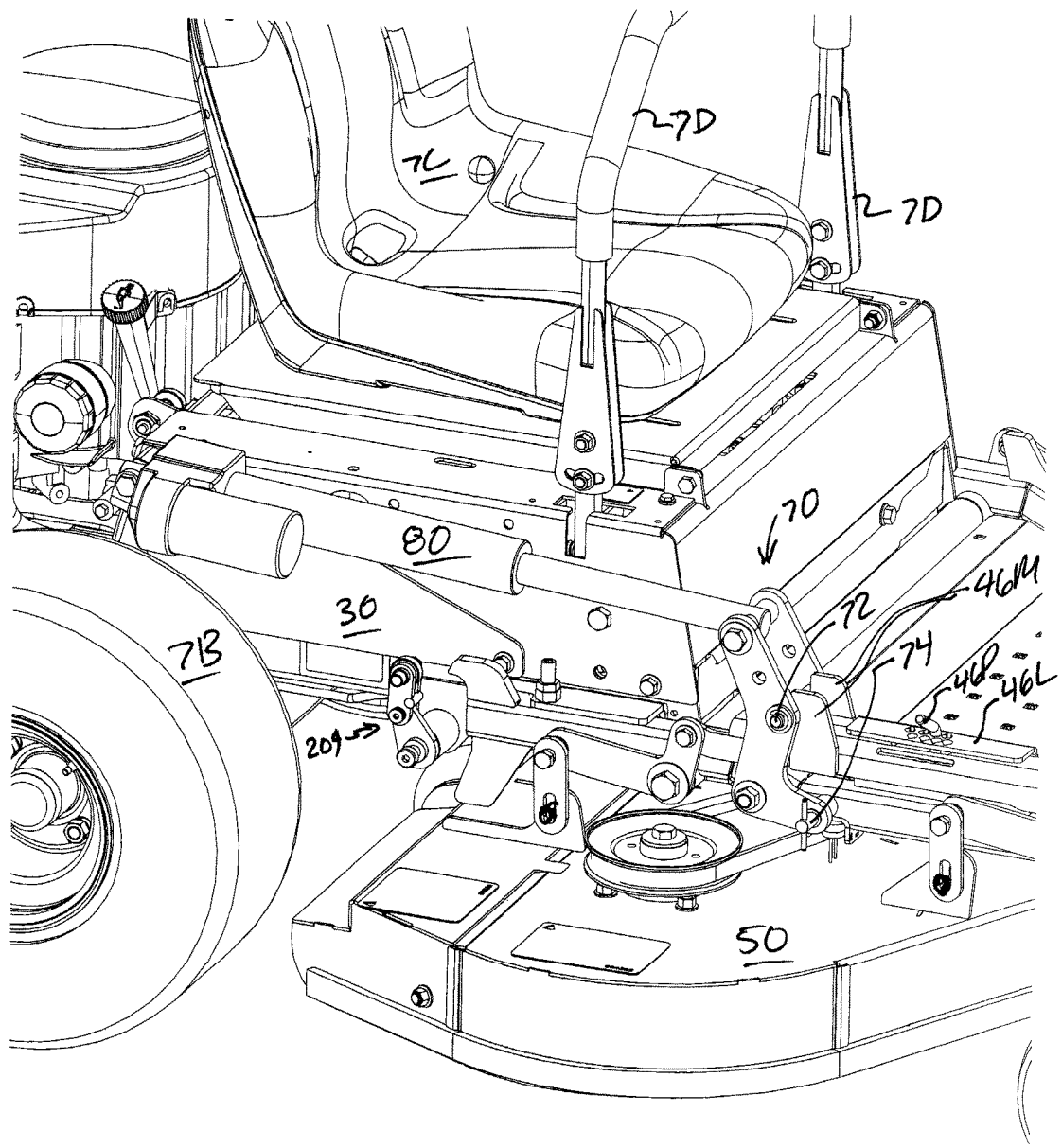
FIG. 5 is a perspective view of one embodiment of the mower shown with the forward frame portion in the lowered mowing position, with the mowing deck raised to the highest cutting position and with the pivot bracket secured to the forward frame portion in preparation for folding the frame and with a frame latch disengaged from the forward frame portion to permit the mower frame to fold.
Figure 6:
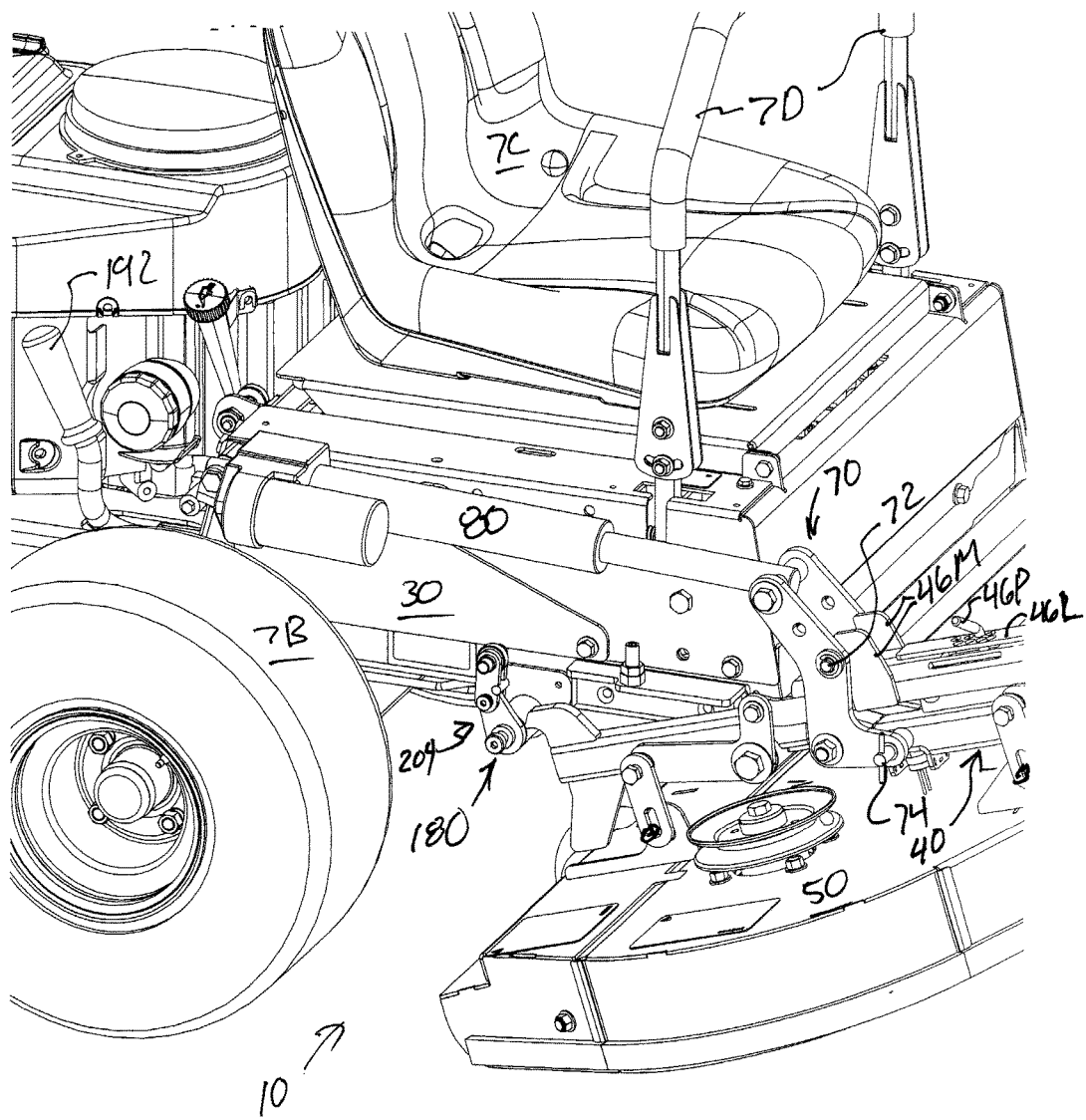
FIG. 6 is a perspective view of one embodiment of the mower shown with the pivot bracket secured to the forward frame portion, with the frame latch disengaged from the forward frame portion, and with the mower frame partially folded up.
Figure 7:
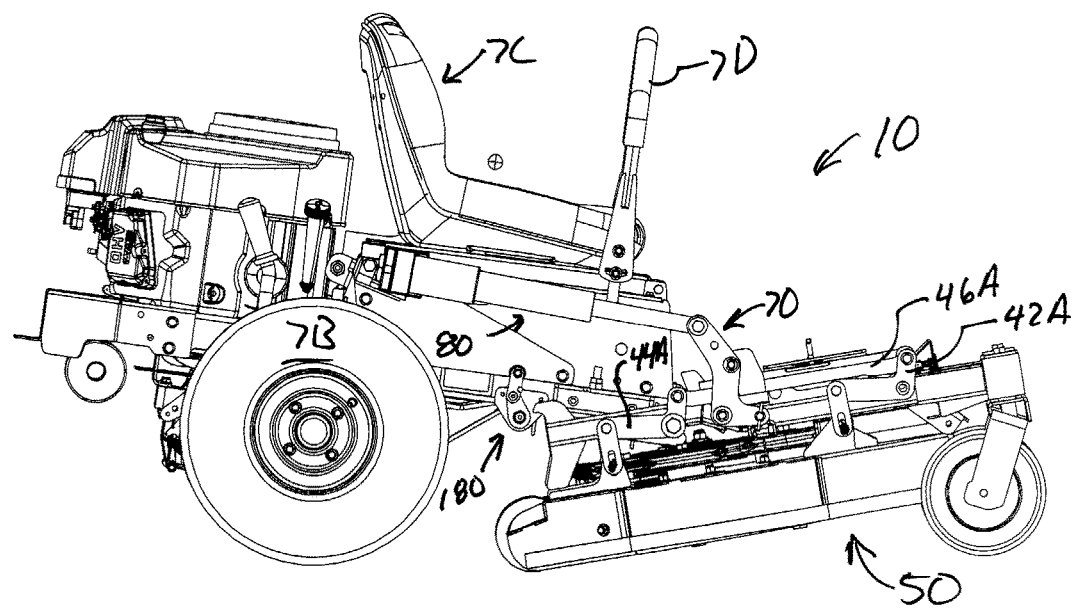
FIG. 7 is a side view of one embodiment of the mower shown with the mower frame partially folded.

In this example, an optional feature is present on the right side of mower 10 in frame latch mechanism 180 which does not need to be duplicated on the left side, namely, a frame latch detector switch 230. Frame latch detector switch 230 is fixed to rear frame portion 30 and is situated to present a button (or similar movable element) which is pressed by the distal end of transfer link 222 when the frame latch mechanism is in the latched position shown in FIG. 10. The button is associated with an electrical switch which generates a positive indication when frame latch mechanism 180 is in the engaged position shown in FIGS. 1 and 10. The actuator 80 (to be discussed in greater detail below) which is used to adjust deck height and to rotate forward frame portion 40 from the mowing position to the folded-up position has a limiter which responds to a positive indication from switch 230. The actuator 80 is preferably infinitely adjustable throughout its range of movement; however, four different positions of the actuator will be specifically described herein and referred to as the first actuation position which is shown in FIG. 1, the second actuator position which is shown in FIG. 3, the third actuator position which is shown in FIG. 4 and the fourth actuator position which is shown in FIG. 8. In this example, actuator 80 has the same degree of extension when it is either in the second position or the third position. However, it is possible for the third position to have a different degree of extension than the second position. When the height of the mower deck is being adjusted between the lowest cutting position and the highest cutting position, actuator 80 moves between the first actuator position and the second actuator position respectively. When mower frame 20 is being folded up from the mowing position shown in FIG. 4 to the folded-up position shown in FIG. 8, actuator 80 moves between the third actuator position and the fourth actuator position respectively. If switch 230 indicates that frame latch mechanism 180 is engaged, the limiter will prevent actuator 80 from retracting past the first position toward the fourth actuator position. This will prevent the mower 10 from being damaged by the actuator 80 trying to fold mower frame 20 while the frame latch mechanism 180 is still engaged. Optionally, a second switch may be installed on frame 40 to detect when pin 74 is placed in holes 70H of pivot bracket 70 and bore 40H of forward frame portion 40. A positive indication from the second switch would also be needed in this optional arrangement before the actuator limiter is deactivated.

Figure 2:
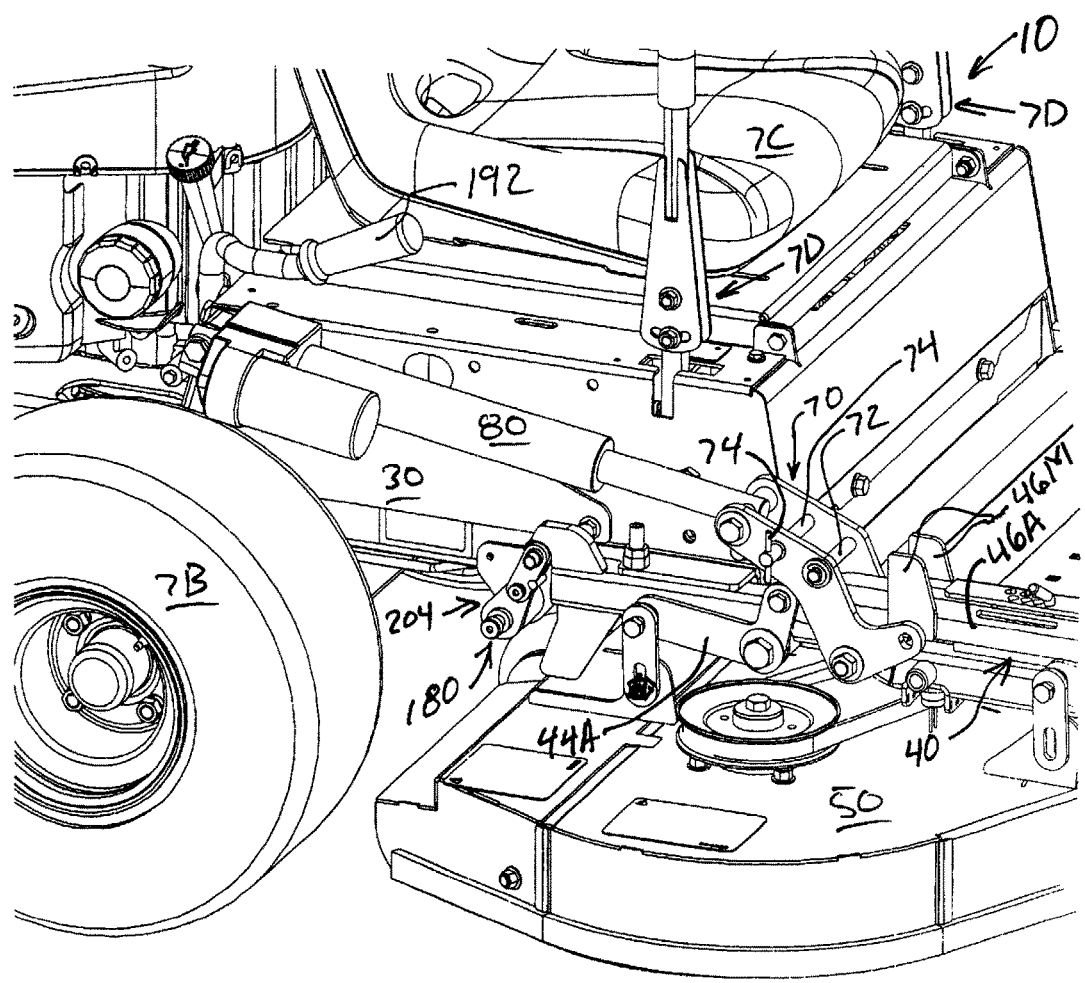
FIG. 2 is a magnified perspective view of one embodiment of the mower shown with the forward frame portion in the lowered mowing position, with the mower deck raised to the highest cutting position and with a pivot bracket associated with raising and lowering the mower deck and moving the forward frame portion between the mowing position and the mower deck access position unlocked from the forward frame portion.
Figure 17:
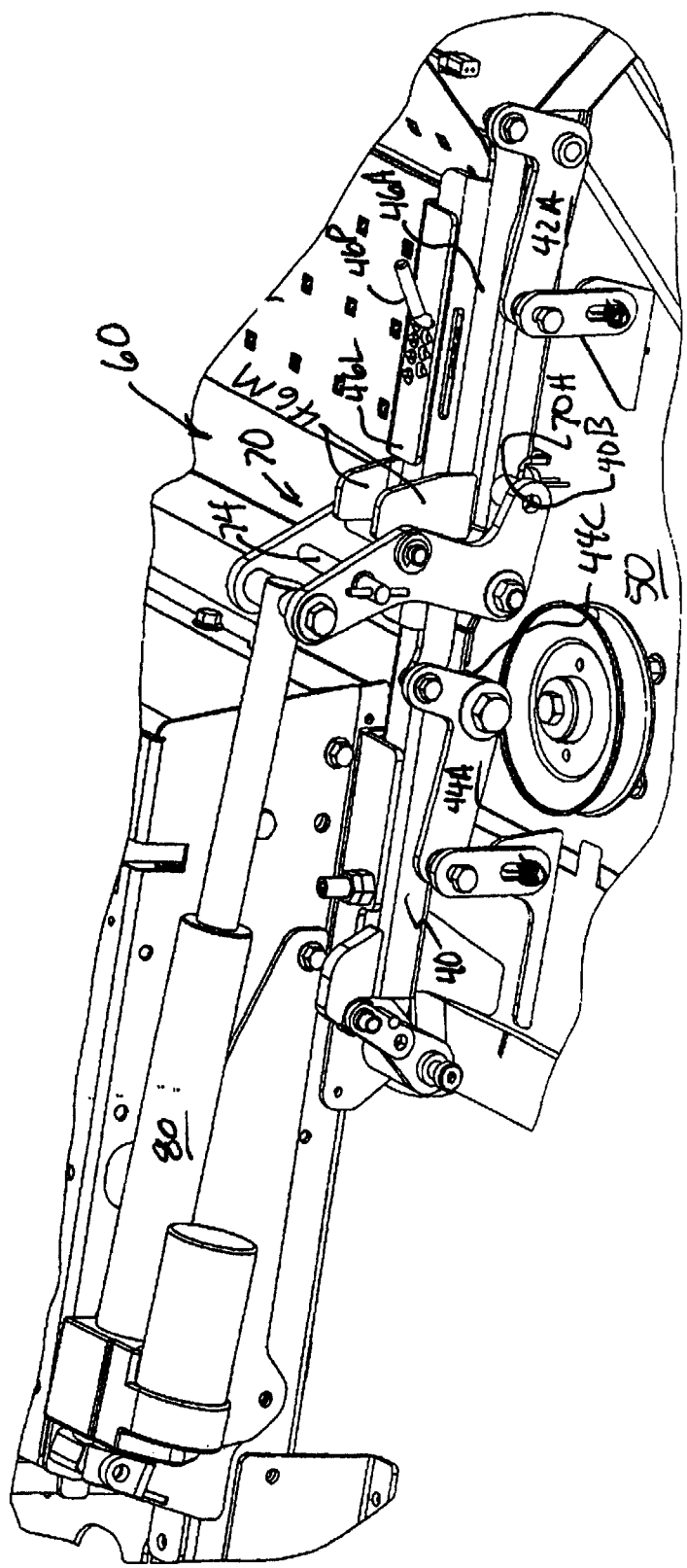
FIG. 17 is a perspective view showing the actuator and a portion of the pivot link assembly shown with the mower deck in the highest cutting position with the pivot bracket properly aligned to be pinned to the forward frame portion for folding the forward frame portion to the folded-up mower deck access position.

When frame latch mechanism 180 is engaged with forward frame portion 40 such that forward frame portion 40 is locked in the mowing position as shown in FIG. 1, it is possible to employ pivot lever assembly 60 to adjust the cutting height of mower deck 50. As can be seen in FIGS. 1-3, mower deck 50 is suspended from pivot lever assembly 60 which includes two forward pivot levers 42A and 42B, two rear pivot levers 44A and 44B, a forward torque tube 42C (indicated in FIG. 15), a rear torque tube 44C (indicated in FIGS. 15 & 17), a right side longitudinal link 46A and a left side longitudinal link 46B. Each pivot lever 42A, 42B, 44A and 44B includes a generally horizontal leg having a distal end which is connected by a depending link to a bracket fixed to mower deck 50. Each pivot lever 42A, 42B, 44A and 44B also includes a generally upright leg which is connected to a longitudinal link as will be described below. Forward pivot levers 42A and 42B are fixed to the opposite ends of forward torque tube 42C. In the same way rear pivot levers 44A and 44B are fixed to the opposite ends of rear torque tube 44C. Both torque tubes 42C and 44C are rotatably mounted to forward frame portion 40. On the right side of forward frame portion 40, the distal ends of the upright legs of rear pivot lever 44A and forward pivot lever 42A are connected by right side longitudinal link 46A. On the left side of forward frame portion 40, the distal ends of the upright legs of rear pivot lever 44B and forward pivot lever 42B are connected by left side longitudinal link 46B. Accordingly, if any of the pivot links are rotated or if either longitudinal link is translated, all of pivot link assembly 42 moves in unison as mower deck 50 moves between a first, low cutting position and a second, high cutting position.

Figure 15:
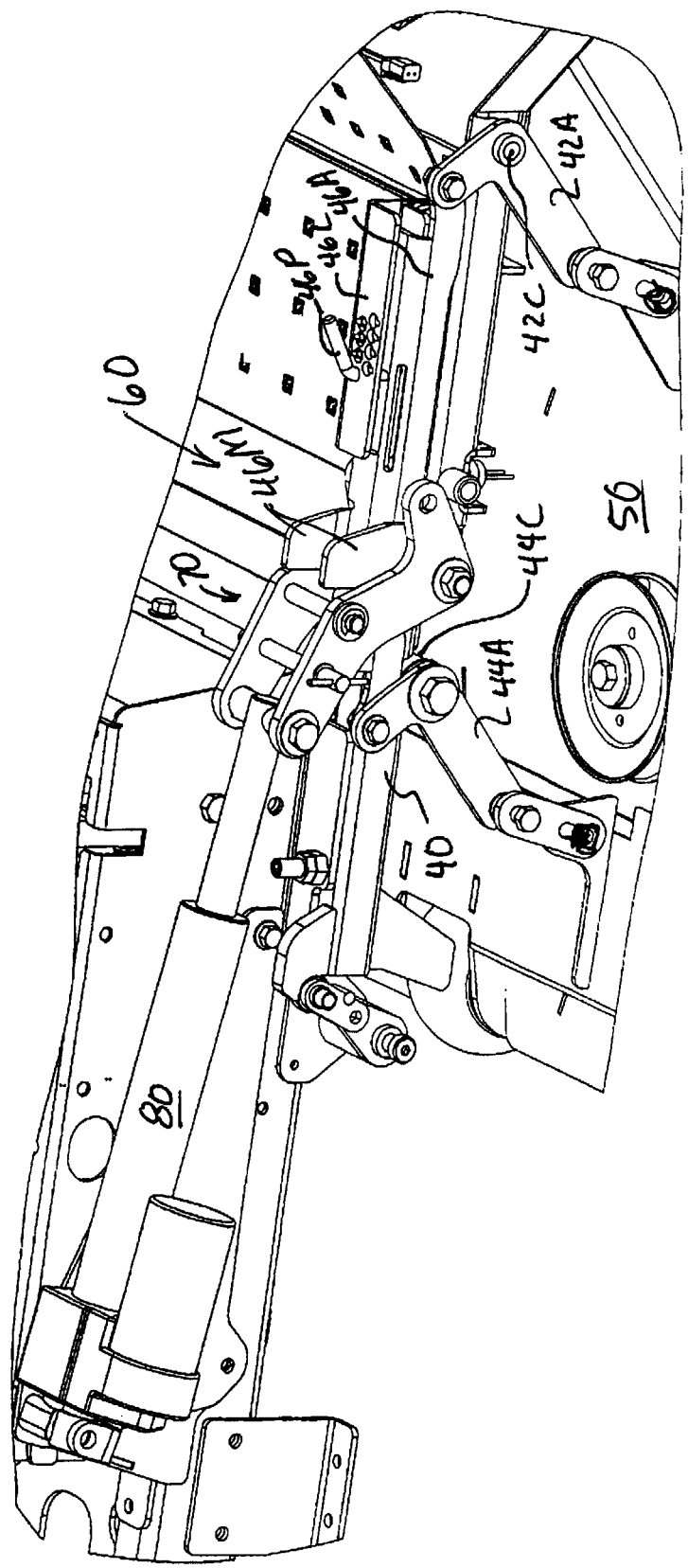
FIG. 15 is a perspective view showing the actuator and a portion of a pivot link assembly adjustably connecting the mower deck to the forward frame section shown with the mower deck in the lowest cutting position.
Figure 16:
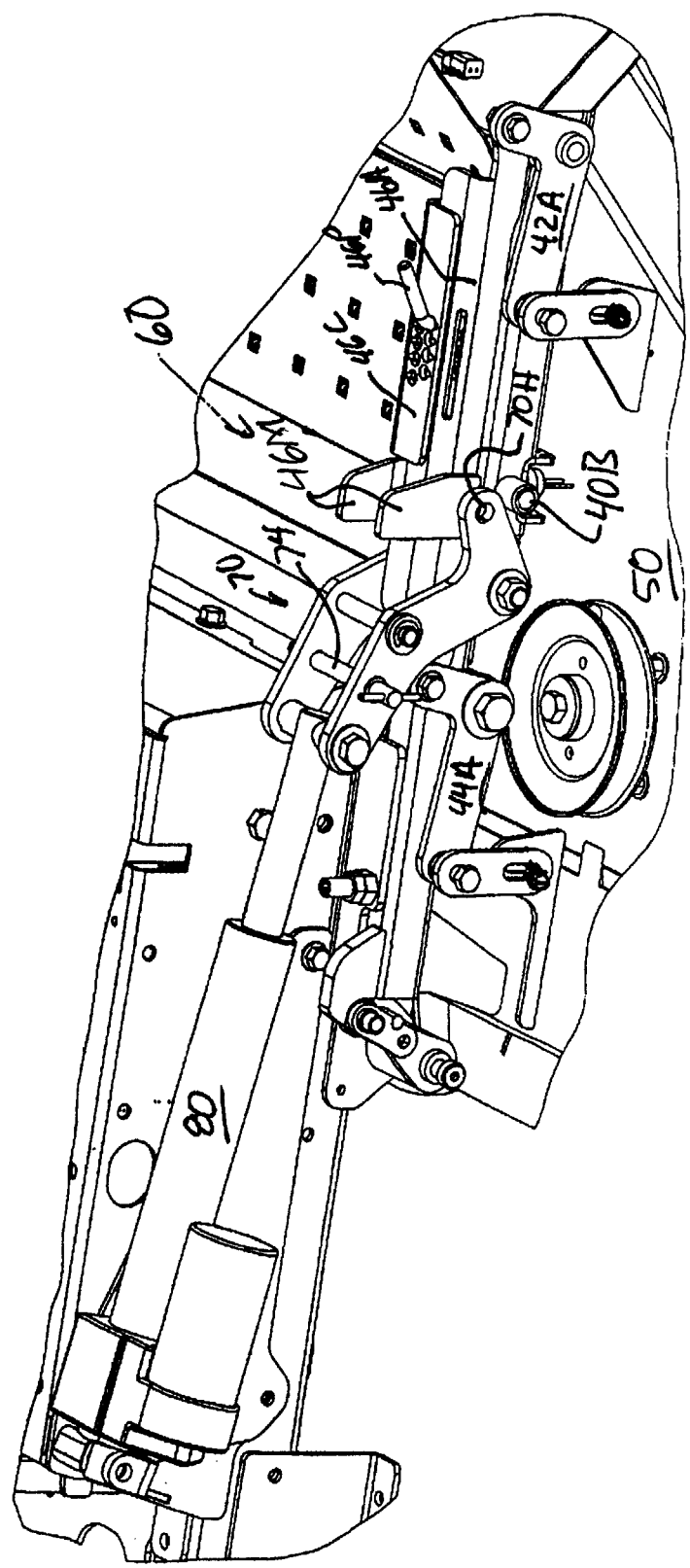
FIG. 16 is a perspective view showing the actuator and a portion of the pivot link assembly shown with the mower deck pinned in the highest cutting position and the pivot bracket retracted from upwardly extending lobes of the pivot link assembly in preparation for mowing.

In this example, right side longitudinal link 46A includes a generally level locking flange 46L, which, in this example, presents a pattern of holes. A corresponding hole pattern is presented by a longitudinal member of forward frame portion 40. As can be seen in FIG. 15, a locking pin 46P is inserted in matching holes in locking flange 46L and forward frame portion 40 to secure mower deck 50 at a selected cutting height. In this example, as can be seen in FIGS. 1-3, right side longitudinal link 46A presents a pair of upwardly extending lobes 46M. The function of upwardly extending lobes 46M will be described below.

In this example, a pivot bracket 70 is pivotably mounted to the right side of forward frame portion 40. The pivot bracket 70 is shown as including a pair of generally L-shaped side plates interconnected by a plurality of pins. Each side plate presents a generally forwardly extending forward leg and a generally upwardly and rearwardly extending upward leg. The pivot bracket 70 is pivotally connected to the forward frame portion 40 by a pin extending through the side plates proximate vertices formed at intersections of the respective forward and upward legs. The forward legs of pivot bracket 70 can be pinned to forward frame portion 40 thereby converting pivot bracket 70 into a fixed bracket which does not pivot.

The upward legs of pivot bracket 70 are pinned to the distal end of an actuator 80 and also present a transverse pin 72 extending between the side plates of pivot bracket 70. Actuator 80 connects between pivot bracket 70 and rear frame portion 30. Actuator 80 may be any powered device or mechanism which may be operated to cause back and forth motion of pivot bracket 70 either as pivot bracket 70, when unlocked, urges movement of pivot assembly 60 or as pivot bracket 70, when fixed to forward frame portion 40, is pulled upon to raise forward frame portion 40 to the folded-up mower deck access position. In this example, actuator 80 is a linear electrically powered actuator but could include a hydraulic cylinder or other form of actuator.

Right side longitudinal link 46A of pivot lever assembly 60 extends through the gap formed between the side plates of pivot lever 70. If pivot bracket 70 is not pinned to forward frame portion 40 and is free to rotate, transverse pin 72 of pivot bracket 70 will contact lobes 46M on right side longitudinal link 46A if actuator 80 is in first actuator position which corresponds to a lowest cutting position of the mower deck 50. Continued extension of the actuator 80, from the first actuator position toward the second actuator position will push the right side longitudinal link 46A along its path of movement until a highest cutting position of the mower deck 50 is reached when actuator 80 is in the second actuator position. Extension of the actuator 80 may be stopped at any point between the first and second actuator positions when a desired cutting height is obtained. Retracting the actuator 80 from the second actuator position toward the first actuator position allows the mower deck 50 to move downwardly on the pivot lever assembly 60. Retraction of the actuator 80 may be stopped at any point between the second and first actuator positions when a desired cutting height is obtained. When the desired deck height is achieved, the operator may choose to insert pin 46P into corresponding holes in locking flange 46L and forward frame portion 40 to set the mower deck height. In this embodiment, it is preferable to retract actuator 80 toward the first actuator position so that pivot bracket 70 is not in contact with lobes 46M during mowing operations.

Actuator 80 is also employed to fold forward frame portion 40 and rear frame portion 30 with respect to each other. In most cases, in order to provide access to the underside of mower deck 50, actuator 80 is used to fold forward frame portion 40 between the first, mowing position shown in FIG. 1 and the second, folded-up position shown in FIGS. 6 and 7. When in the mowing position shown in FIG. 1, frame 20 is generally flat and unfolded with rear frame portion 30 and forward frame portion 40 generally in the same plane and defining a generally straight angle of 180°. In this example, before the folding action can be performed, mower deck 50 is raised to the highest cutting position as shown in FIGS. 2-5, 16 & 17 and a pivot bracket pin 74 which, in this example, is stowed in a pair of opposite holes in the upwardly extending legs of pivot bracket 70, is removed from its stowed position and inserted in corresponding holes 70H in the forwardly extending legs of pivot bracket 70 and a corresponding bore 40B defined in forward frame portion 40 as shown in FIGS. 4-8. Holes 70H and bore 40B align with each other when the actuator 80 is in the third actuator position, allowing insertion of the pivot bracket pin 74 therethrough. The insertion of pivot bracket pin 74 through the bore 40B in forward frame portion 40, as shown in FIGS. 4-8, locks pivot bracket 70 to forward frame portion 40. Still further, prior to folding forward frame portion 40, latch mechanism 180 described above must be moved to the unlatched position shown in FIGS. 11 and 12.

This action also releases frame latch detector switch 230 shown in FIG. 11, which, in turn, turns off the limiter in actuator 80 in order to allow actuator 80 to retract. At this point, actuator 80 is in the third actuator position. Once this configuration is attained, the retraction of actuator 80 from the third actuator position shown in FIG. 5 to the fourth actuator position shown in FIG. 8, will, if rear frame portion 30 is sufficiently weighted, cause forward frame portion 40 to pivot about the torque tube and axis A indicated in FIGS. 1, 18 and 19 from the mowing position shown in FIGS. 3 and 20 to the folded position shown in FIGS. 8 and 21 which, in this example, is suitable for accessing the underside of mower deck 50. As noted above, in this example, the second and third positions of the actuator 80 are essentially the same position.

Figure 13:
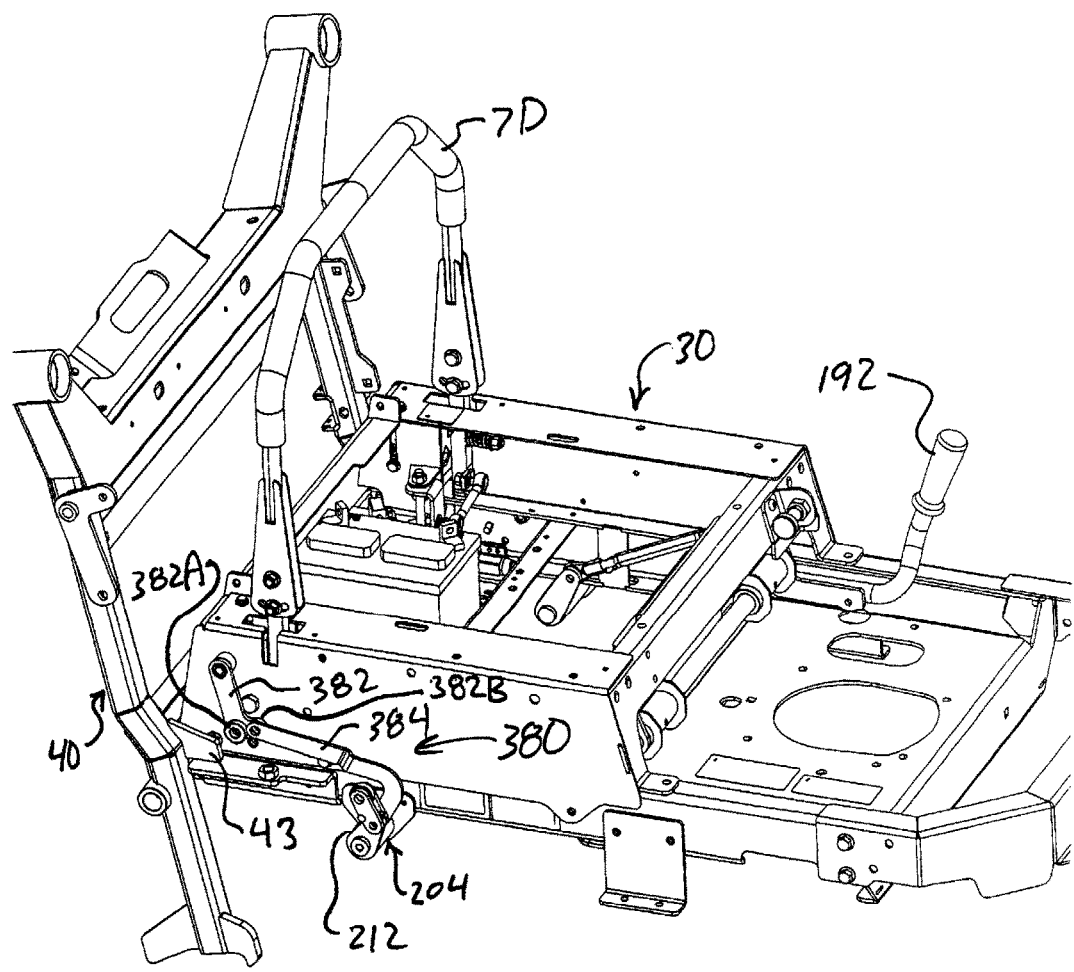
FIG. 13 is a fragmentary perspective view of one embodiment of the mower showing the left side of the mower with the mower frame folded and with the frame latch and the safety latch both disengaged.
Figure 14:
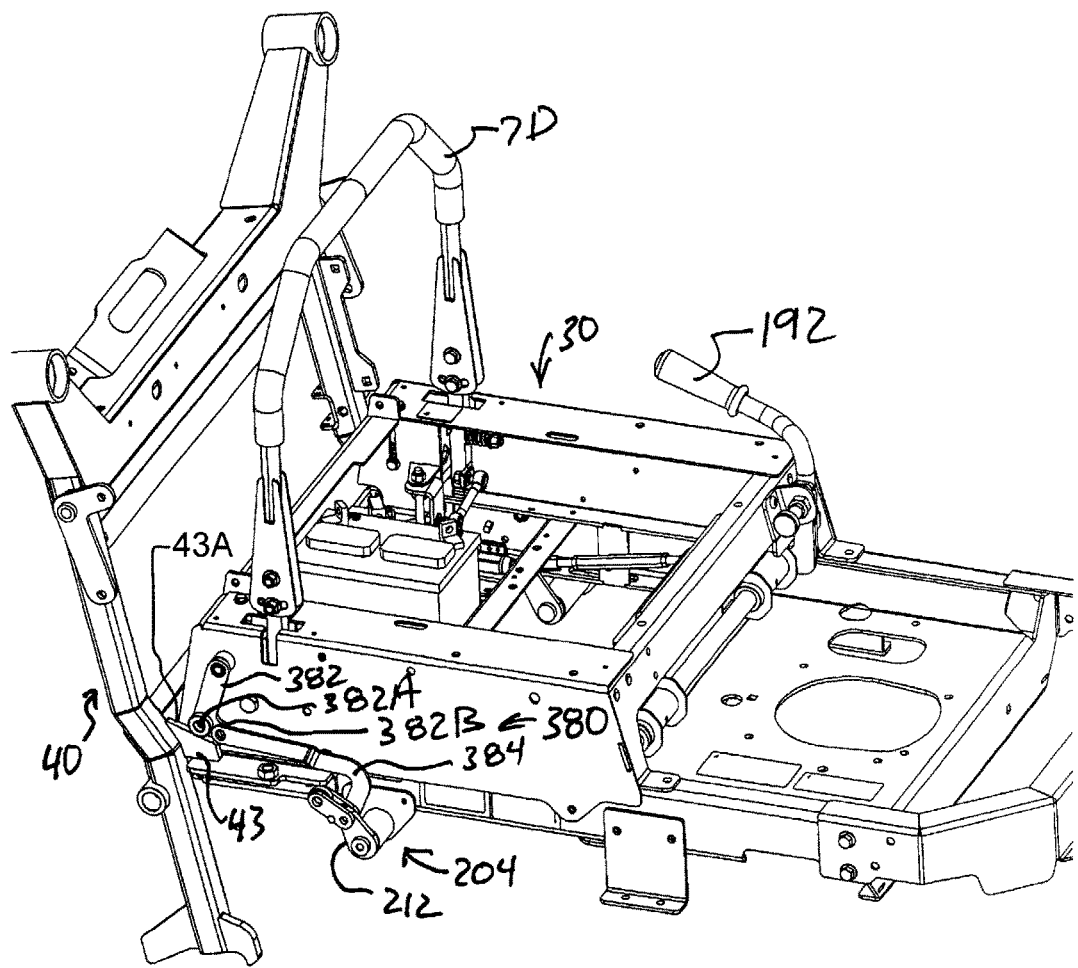
FIG. 14 is a fragmentary perspective view of one embodiment of the mower showing the left side of the mower with the mower frame folded showing the frame latch disengaged and showing the safety latch engaged for securing the forward frame portion in a folded-up mower deck access position.

In this example, an optional safety latch mechanism 380 shown in FIGS. 9, 13 and 14 is provided for securing forward frame portion 40 in the folded-up position as shown in FIGS. 8 and 9. As can be best seen in FIGS. 13-15, safety latch mechanism 380 includes a roller link 382, a link arm 384 and a roller flange 43. Roller link 382 is pivotably mounted to the left side wall of rear frame portion 30 and is capable of pivoting between a first, released position shown in FIG. 13 and a second, engaged position shown in FIG. 14. Roller link 382 carries a roller 382A and has a lobe 382B for pivotably connecting to link arm 384 at the forward end of link arm 384. The opposite rear end of link arm 384 is hook shaped for clearing over center link assembly 204 and is pivotably connected to the distal end of proximal link 212 of left over center link assembly 204. Roller flange 43 is fixed to forward frame portion 40 as shown in FIGS. 13-15. Roller flange 43 presents a sloped edge 43A (indicated in FIG. 14) which is suitable for receiving roller 382A when forward frame portion 40 is in the folded-up position shown in FIGS. 13 and 14.

The operation of safety latch mechanism 380 may be understood by referring to FIGS. 13 and 14. When forward frame portion 40 is in the folded-up position shown in FIGS. 13 and 14, the operator, by moving frame latch handle 192 from the rearward position shown in FIG. 13 to the forward position shown in FIG. 14, causes roller link 382 to pivot between the first, released position shown in FIG. 13, in which roller 382A does not engage roller flange 43, to a second, engaged position shown in FIG. 14. When roller link 382 moves to the second, engaged position, it rotates over center as roller 382A engages sloped edge 43A. Because of this over center action, roller 382A tends to stay in place and handle 192 tends to maintain its forward position shown in FIG. 14. However, if the operator exerts sufficient rearward force on handle 192, safety latch mechanism 380 can be moved to the released position shown in FIG. 13.

Figure 22:
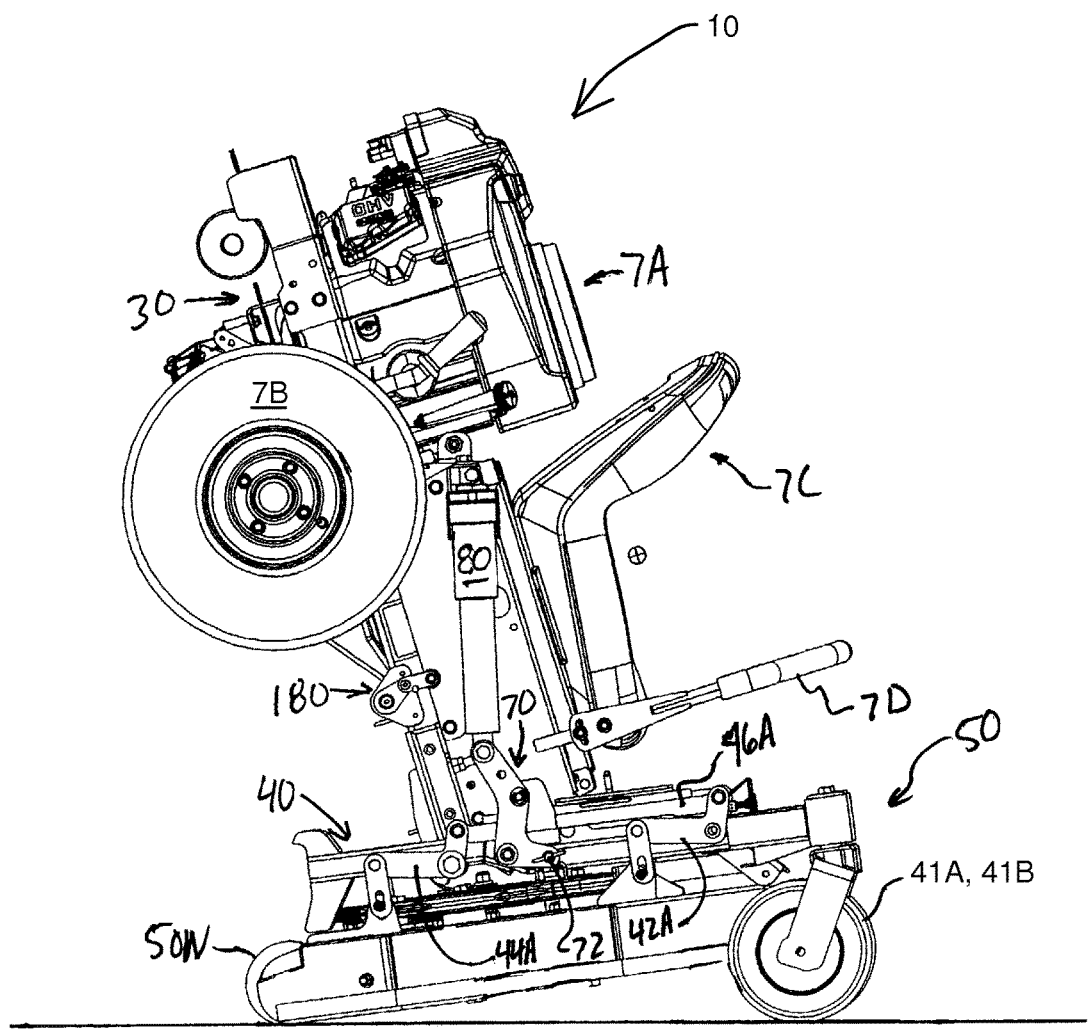
FIG. 22 is a side view of one embodiment of the mower showing the mower frame folded with the forward frame on a ground surface with the rear frame raised for providing access to components mounted to the rear frame portion.

A second folding mode for folding up the rear frame portion of an embodiment of mower 10 while the front frame portion remains stationary may be understood by referring to FIG. 22. In FIG. 22, forward frame portion 40 may be retained or anchored or weighted sufficiently or configured to receive an external weight (such as a person) such that when actuator frame latch 180 is released, pivot bracket 70 is secured by pin 72 and actuator 80 is retracted in a second frame folding mode, forward frame portion 40 remains stationary and supported by wheels 50W and 41A and 41B and rear frame 30 folds up to the position shown in FIG. 22. This rear frame folded-up position may be advantageous for accessing engine 7A or changing drive wheels 7B or the tires mounted to wheels 7B or accessing other portions of rear frame portion 30 which might be difficult to access with rear frame portion 30 in a normal operating position as shown in FIG. 1. Accordingly, the operation of "folding-up" forward frame portion 40 might be better understood as an operation in which the angle defined by rear frame portion 30 and forward frame portion 40 is reduced from an operating angle which is generally a straight angle of 180° to a folded-up angle which is substantially less than 180°. In the example shown in FIG. 22, the folded-up angle is approximately 110°. The applicants contemplate that safety features or warnings which are neither disclosed or claimed herein may be necessary before an operator could safely execute the above described rear frame folding mode, and not every embodiment of this invention will necessarily be suitable for folding up the rear portion of the frame.

Figure 18:
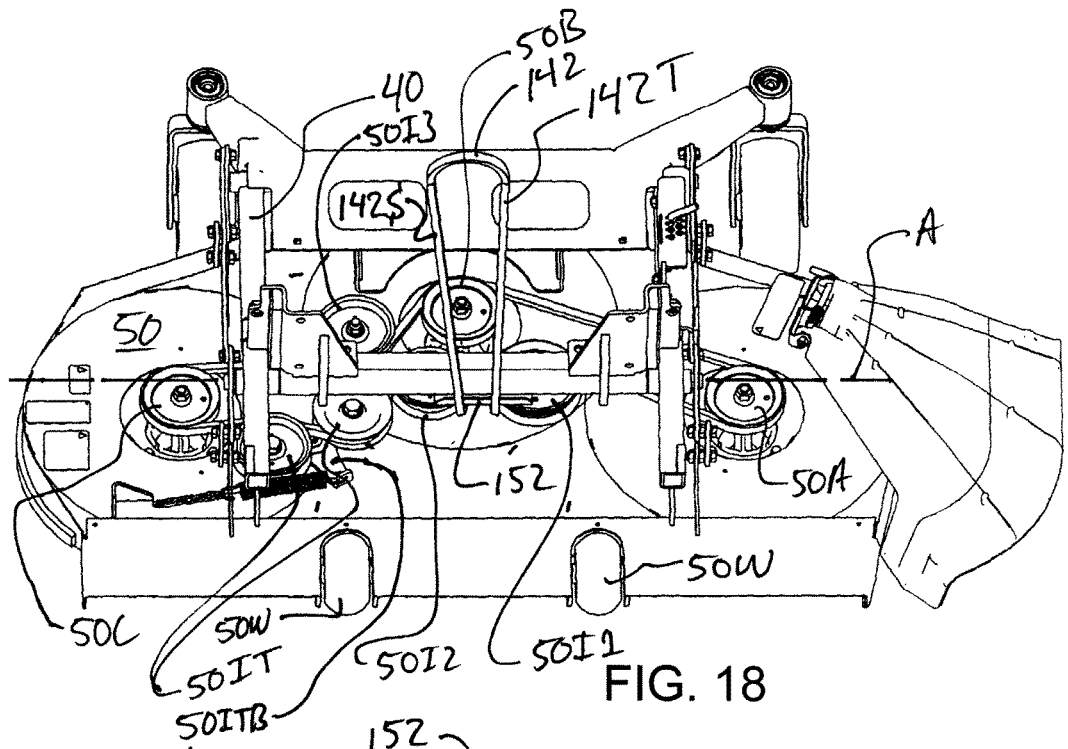
FIG. 18 is a top perspective rear view of the forward frame portion and the mower deck shown with the frame folded for providing access to the mower deck.
Figure 19:
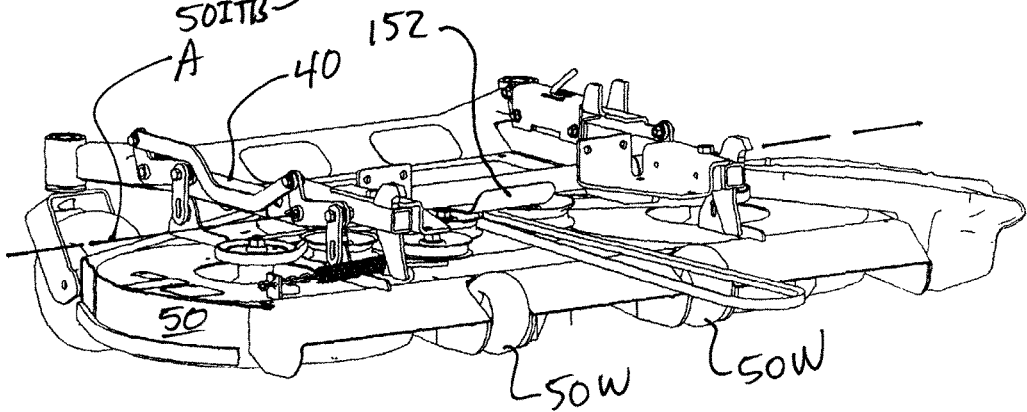
FIG. 19 is a perspective rear view of the forward frame portion and the mower deck shown in an unfolded mowing position.
Figure 20:
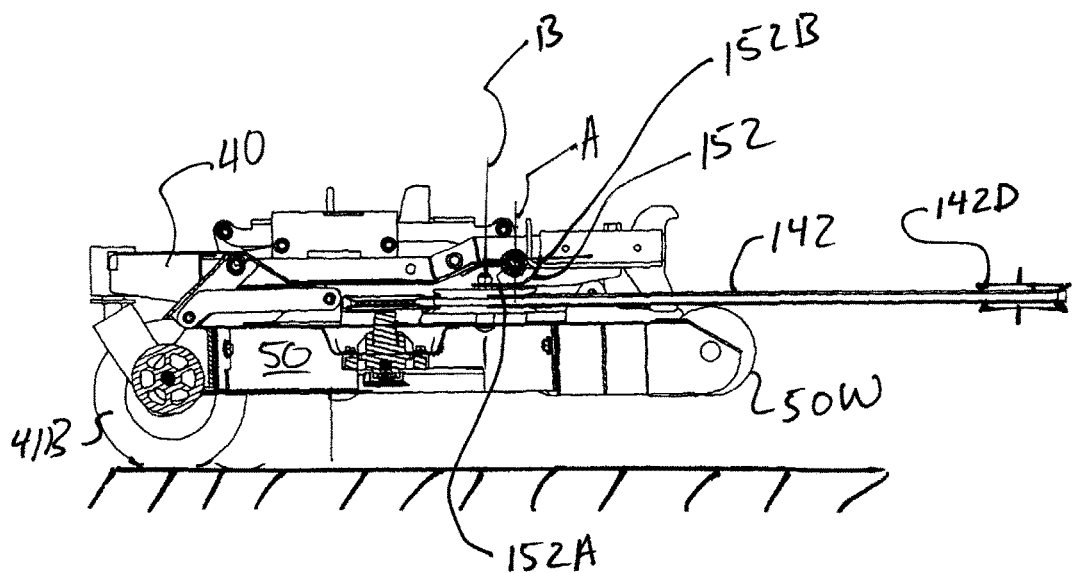
FIG. 20 is a side view of the forward frame portion and the mower deck in the mowing position.

A common problem encountered in large mowers having tilt-up mower decks is the need to remove and replace a deck drive belt when a mower deck is tilted up. FIGS. 18-21 (which show only forward frame 40 and mower deck 50 for clarity) illustrate how a belt guide plate 152 is used to guide a deck drive belt 142 such that deck drive belt 142 continues to maintain alignment with the pulleys of mower deck 50. As can be seen in FIG. 18, in this example, mower deck 10 includes three cutting blade drive sheaves 50A, 50B and 50C. Deck drive belt 142 may be considered as having a tight side 142T and a slack side 142S. As can be seen in FIG. 20, deck drive belt 142 extends back to drive sheave 142D which is powered by the mower engine which is not shown in FIGS. 18-21. The skilled reader should note that both sides of belt 142T and 142S are generally closely spaced to each other and extend generally longitudinally from two opposite idler pulleys 50I1 and 50I2 rotatably mounted to mower deck 50. A spring biased pair of tensioner pulleys 50IT which are carried by a common spring biased bracket 50ITB are provided to take up slack in slack side 142S of deck drive belt 142. A third idler pulley 50I3 is situated immediately to the right of center cutting blade drive sheave 50B in order to provide suitable wrap around for deck drive belt 142 around sheave 50B.

As noted above, belt guide plate 152 is provided to guide deck drive belt 142 so that deck drive belt 142 continues to be received by idler pulleys 50I1 and 50I2 even when forward frame portion 40 and mower deck 50 are folded from the mowing position shown in FIGS. 1-5, 19 and 20 to the folded-up position shown in FIGS. 8, 9 and 21. In this example, to accomplish this, belt guide plate 152 is mounted to the same bushings which carry idler pulleys 50I1 and 50I2. For this arrangement to work, in this example, the axes of rotation B (shown in FIG. 20) for idler pulleys 50I1 and 50I2 have generally the same longitudinal set back with respect to mower frame 20 and the axes of rotation B are preferably situated at least as far forward as transverse axis A which is the axis of rotation for forward frame portion 40. As can be seen in FIG. 20, in this example, the axes of rotation for idler pulleys 50I1 and 50I2 are located slightly forward of frame pivot axis A. As can be best seen in FIG. 20, in this example, guide plate 152 includes a generally flat portion 152A which is generally parallel to deck 50 and a curved portion which is generally maintains constant spacing from frame pivot axis A. In this example, the curved shape of belt guide plate 152 is arranged to guide belt 142 so that it remains in captured contact with the grooved outer rims of idler pulleys 50I1 and 50I2. Thus, when forward frame portion 40 is folded up as shown in FIG. 21, deck belt 142 remains seated in idler pulleys 50I1 and 50I2, thereby eliminating the need to remove or replace a drive belt when mower deck 50 is folded up for access. As can also be seen in FIGS. 18-21, a pair of wheels 50W are rotatably mounted to the back extremity of mower deck 50 for rolling engaging a ground surface and supporting mower deck 50 and forward frame portion 40 when forward frame portion 40 and mower deck 50 are rotated to the folded-up position. This further facilitates the folding process making it very easy for an operator to fold up mower deck 50 for various operations as described above.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A mower comprising:
   a principal frame including a rear frame portion having one pair of ground engaging drive wheels and a forward frame portion having a second pair of wheels, the rear frame portion and the forward frame portion being hinged together for folding about a transverse axis between a first, mowing position and a second, folded position,
   a mower deck suitable for cutting grass, the mower deck adjustably connected to the forward frame portion by a pivot lever assembly that is movable for adjusting the height of the mower deck between a first low position for cutting grass at a first length and a second elevated position for cutting grass at a second length that is longer than the first length,
   an actuator assembly operatively interconnecting between the rear frame portion and the forward frame portion, the actuator assembly being operable in two modes; (a) a first mode wherein the actuator assembly moves between a first actuator position and a second actuator position thereby causing the mower deck height to be adjusted between the first low position and the second elevated position; (b) and a second mode wherein the actuator assembly moves between a third actuator position and a fourth actuator position thereby causing the forward frame portion to fold with respect to the rear frame portion along said transverse axis between the first, mowing position and the second, folded position,
   the actuator assembly being connected to the forward frame portion by a pivot bracket and the pivot bracket being selectively connectable to the forward frame portion in one of two connection modes, (a) a first pivoting connection mode wherein the pivot bracket is free to pivot with respect to the forward frame portion, and (b) a second fixed connection mode wherein the pivot bracket is fixed to the forward frame portion and is not free to pivot with respect to the forward frame portion,
   such that when the pivot bracket is connected to the forward frame portion in the first pivoting connection mode, the pivot bracket is able to urge the pivot lever assembly between the first position and the second position when the actuator moves between the first actuator position and the second actuator position thereby causing the mower deck to move between the first low position and the second elevated position, and such that when the pivot bracket is connected to the forward frame portion in the second fixed connection mode, the actuator is able to move between the third actuator position to the fourth actuator position thereby causing the forward frame portion and the rear frame portion to fold and unfold with respect to each other.

2. The mower of claim 1, further comprising:
   a frame latch operable for locking the forward frame portion in the first, mowing position.

3. The mower of claim 2, further comprising:
   a safety latch operable for securing the forward frame portion in the second, folded position.

4. The mower of claim 3, wherein:
   the frame latch for securing the forward frame portion in the first, mowing position and the safety latch for securing the forward frame portion in the second, folded position are able to be actuated by a manual operator control that is operable to move between a first non-engaging position and a second engaging position, such that when the manual operator control is in the first non-engaging position, both the frame latch and safety latch are in a non-engaging position and such that when the manual operator control is in the second engaging position, both the frame latch and safety latch are in the engaging position, and such that the frame latch engages and locks the forward frame portion in the first, mowing position when the forward frame portion is down while the safety latch also moves into an engaging position but does not engage the forward frame portion and such that the safety latch engages and locks the forward frame portion in the second, folded position when the forward frame portion is folded up while the first frame latch also moves into an engaging position but does not engage the forward frame portion.

5. The mower of claim 1, further comprising:
   a deck drive belt extending from the rear frame portion to the forward frame portion that is operable to drive the at least one cutting blade of the mower deck, the deck drive belt entrained around a drive pulley on the rear frame portion and at least one deck pulley on the mower deck; and
   a guide plate positioned on the forward frame portion above the deck drive belt that is operable to engage the deck drive belt during folding of said forward frame portion into the folded-up mower deck access position and thereby prevent the deck drive belt from becoming dis-entrained from the drive pulley and the at least one deck pulley.

6. A mower comprising:
   a principal frame including a rear frame portion having one pair of ground engaging drive wheels and a forward frame portion having a second pair of wheels, the rear frame portion and the forward frame portion being hinged together for folding about a transverse axis between a first, mowing position and a second, folded position,
   a mower deck suitable for cutting grass, the mower deck adjustably connected to the forward frame portion for height adjustments between a first low position for cutting grass at a first length and a second elevated position for cutting grass at a second length that is longer than the first length, the mower deck including at least one cutting blade,
   an actuator assembly operatively interconnecting between the rear frame portion and the forward frame portion, the actuator assembly being operable in two modes; (a) a first mode wherein the actuator assembly moves between a first actuator position and a second actuator position thereby causing the mower deck height to be adjusted between the first low position and the second elevated position; (b) and a second mode wherein the actuator assembly moves between a third actuator position and a fourth actuator position thereby causing the forward frame portion to fold with respect to the rear frame portion along said transverse axis between the first, mowing position and the second, folded position, a deck drive belt extending from the rear frame to the forward frame portion and operable to drive the at least one cutting blade of the mower deck, the deck drive belt entrained around a drive pulley on the rear frame and at least one deck pulley on the mower deck; and a guide plate positioned on the forward frame portion above the deck drive belt and operable to engage the deck drive belt during folding of said forward frame portion into the second folded position and thereby prevent the deck drive belt from becoming dis-entrained from the drive pulley and the at least one deck pulley, the deck drive belt including tight and slack sides on opposite sides of the drive pulley; and a plurality of the deck pulleys including first and second idler pulleys, each of the idler pulleys positioned to engage a respective one of the tight side and slack side of the deck drive belt and retain the tight and slack sides of the deck drive belt in closely spaced relation to each other below the guide plate.

7. The mower of claim 6, wherein:
the first and second idler pulleys retain the tight and slack sides of the deck drive belt in a longitudinal orientation relative to the principal frame.

8. The mower of claim 7, wherein:
the first and second idler pulleys rotate about respective axes of rotation which are positioned at least as far forward on the principal frame as the transverse axis about which the forward frame portion pivots relative to the rear frame portion and which are substantially equally spaced from the transverse axis.

9. The mower of claim 6, wherein:
the guide plate includes a flat portion oriented substantially parallel to the mower deck and an upwardly curved portion.

10. The mower of claim 9, wherein:
the upwardly curved portion of the guide plate maintains substantially constant spacing from the transverse axis about which the forward frame portion pivots relative to the rear frame portion.

11. The mower of claim 10, wherein:
the first and second idler pulleys are mounted on the mower deck for rotation about respective axles and the flat portion of the guide plate is secured to the axles.

* * * * *